May 8, 1951   H. E. ROBERTSON   2,551,904
BOLSTER
Filed Jan. 24, 1950
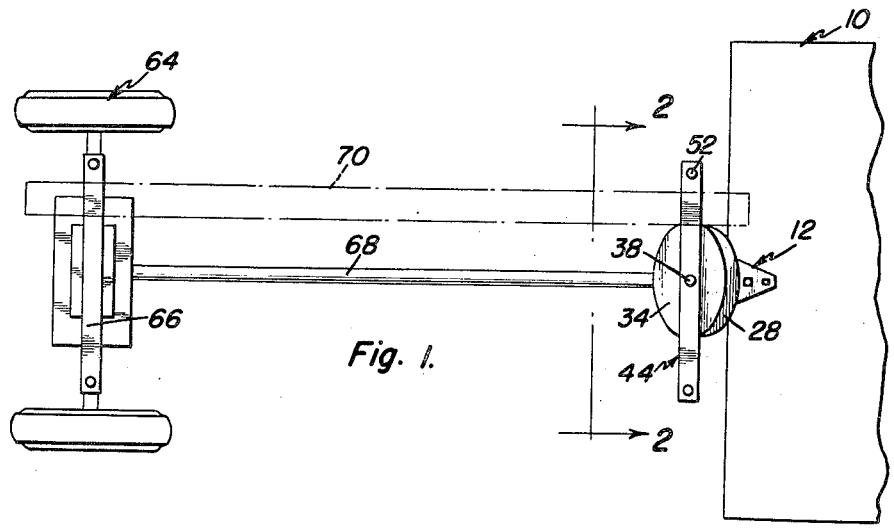
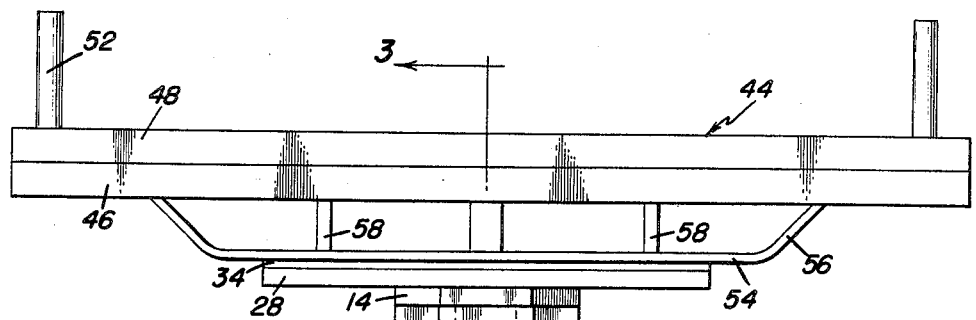
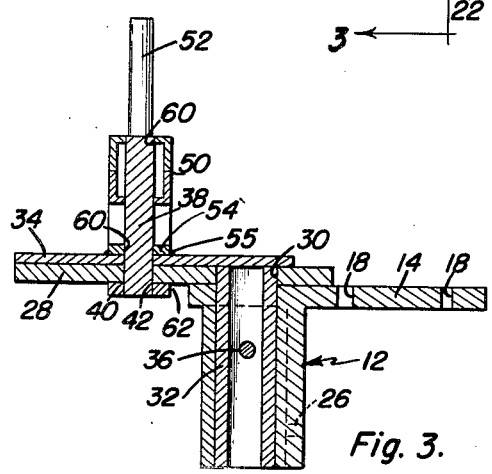
Herschel E. Robertson
INVENTOR.

Patented May 8, 1951

2,551,904

UNITED STATES PATENT OFFICE 2,551,904

BOLSTER

Herschel E. Robertson, Nowata, Okla.

Application January 24, 1950, Serial No. 140,250

4 Claims. (Cl. 280—33.44)

This invention relates to bolsters of the type used for supporting long poles or joints of pipe during transport of the same, and more particularly to a bolster of this type adapted to be disposed rearwardly of the truck bed which supports the same.

The primary object of this invention is to support the forward end of long poles or joints of pipe in such a manner that they will not make contact with a towing vehicle, even when negotiating sharp turns.

Another important object of this invention is to provide a pivoted support rearwardly of a conventional truck bed so that objects supported thereon will not contact portions of the truck bed even though the latter be of the conventional box type.

Another important object of this invention is to provide a device of this character which may be readily attached to or removed from a truck bed, and which will not require any modification of the truck bed for embodying the device.

Still another object of this invention is to provide a device of this character which will be simple in construction and inexpensive to manufacture, and yet efficient and durable for the purposes intended.

A meritorious feature of the present invention resides in the bolster support bracket which is so constructed that the same may be permanently attached to a truck bed and has a flat upper surface which will not interfere with the normal uses of the truck bed.

Another important feature of the present invention resides in the means provided for furnishing the bolster with a bearing support, which carries a king pin that is disposed a substantial distance behind the trailing edge of the truck bed.

A final important feature to be specifically enumerated herein resides in the construction of the bolster, which requires a minimum of material so as to be light in weight and a combined bearing member and reinforcing member incorporated therewith.

These, together with various ancillary features and objects of the invention which will later become apparent as the following description proceeds, are attained by the present invention, a preferred embodiment of which has been illustrated by way of example only in the accompanying drawings, wherein:

Figure 1 is a top plan view of the present invention, showing the same in use with a truck bed and a trailer for supporting an elongated object indicated in dotted outline;

Figure 2 is a rear elevational view of the present invention, certain concealed portions being indicated in dotted outline;

Figure 3 is a vertical sectional view of the present invention, being taken upon the plane of the section line 3—3 of Figure 2; and Figure 4 is an enlarged top plan view of the support bracket, certain concealed portions of the same being indicated in dotted outline and showing the same attached to the trailing edge of the truck bed.

Reference is now made more specifically to the accompanying drawings, wherein like numerals designate similar parts throughout the various views, and in which the reference numeral 10 indicates generally the rear portion of a truck bed of a conventional truck, not shown, to which the subject matter of this invention is to be attached.

As best shown in Figures 3 and 4, a bolster support bracket 12 is provided which is substantially L-shaped and preferably of integral construction and comprises a generally diamond-shaped, flat upper plate 14, the forward portion of which overlies the truck bed 10 and is secured thereto by bolts 16 extending through apertures 18 in the plate 14. A rectangular portion 20 depends from the plate 14 adjacent its rear end and a rectangular opening 22 extends vertically through the depending portion 20 and the plate 14 to define a pocket for the bracket 12, the function of which will be set forth more fully hereinafter.

A pair of vertical oppositely extending ribs 24 are formed integrally with the leading edge of the depending portion 20 which merge at their upper end with the under surface of the plate 14, and are provided with suitable apertures 26 through which suitable fasteners secure the bracket 12 to the trailing edge of the truck bed 10 as will be readily understood.

An oval support plate 28 is disposed on the plate 14 so as to overlap the rear edge thereof and extends rearwardly therefrom as clearly seen in Figure 3, the support plate 28 having an aperture 30 in registry with the opening 22. A tubular member 32 depends from the plate 28, which member 32 is held in the aperture 30 as by being welded to the plate 28 flush with the upper surface thereof. In the preferred construction, registering bores are provided through the portions 20 and 32 for receiving a pin or bolt 36 to lock the portion 32 within the portion 20. A bearing plate 34 slidably disposed on the plate 28, which plate 34 is preferably oval shaped to correspond substantially to the shape of the plate 28. As will be readily understood upon reference to Figure 3, the plates 28 and 34 provide a support for the bolster to be presently described placed substantially rearwardly from the truck bed 10, with the portion 32 and the bracket 12 cooperating to retain the plates in a horizontal position.

A king pin 38 is provided to which is suitably secured as by welding or the like at the lower end thereof a washer 40. The king pin 38 extends upwardly through registering apertures 42 through the plates 28 and 34 with the washer 40 flush against the under surface of the plate 28, and with the king pin 38 disposed rearwardly of the bracket 12. A bolster indicated generally at 44 comprises, as best shown in Figures 2 and 3, a pair of opposed channel members 46 and 48 which are suitably secured along their engaging edges as by welding 50, to form a sturdy elongated support member of box-like or tubular construction. A pair of load retaining posts 52 are provided, which are disposed adjacent the opposite outer ends of the channel 46, being upstanding therefrom and suitably attached thereto. A brace member 54 is disposed in spaced relation below the channel 46, which brace member is straight substantially its entire distance and rigidly secured to the plate 34 as by welding 55, but which adjacent its opposite ends is bent upwardly and outwardly as at 56 to have its opposite extremities suitably secured to the under surface of the channel 46. There is also provided a pair of braces which connect the member 54 to the channel 46 which lend support to the channel 46 from the member 54 and maintain the channel 46 and the member 54 in spaced relation. It will thus be seen that the bolster 44 is of light weight, but durable and rugged construction which is well adapted to support heavy loads. The bolster 44 and the bearing plate 32 pivotally receive the king pin 38 which extends through aligned openings 60 through the channel members 46 and 48, plate 34 and the brace member 54. Although the bolster 44 may be secured to the king pin 38 in various suitable ways, in the preferred construction the washer 40 is suitably secured as by welding 62 to the under surface of the plate 28 and the bolster 44 is retained about the king pin 38 by its own weight.

It is believed the use of the present invention will be readily understood. A trailer having a wheel support indicated generally at 64 having a bolster 66 thereon and a long tongue 68 is provided, the forward end of the tongue 68 being pivotally coupled to the rear end of the truck, not shown. The arrangement being such that the trailer is free to swing relative to the truck bed 10 upon turning of the towing vehicle or truck. Long poles or joints of pipe, a single pole being indicated in dotted outline in Figure 1 at 70, are disposed on the bolsters 66 and 44 so that upon swinging movement of the trailer with respect to the truck bed 10 the pole 70 remains in parallel alignment with the tongue 68 without shifting upon the bolster 44 due to the bolster 44 being pivotally mounted upon the king pin 38 as will be readily understood. The primary advantage of this invention resides in the bolster 44 being disposed and offset rearwardly with respect to the truck bed 10 whereby poles disposed thereon sweep over little or no area of the truck bed 10 upon swinging movement of the trailer when the towing vehicle negotiates a turn. By the bolster being disposed rearwardly of the truck bed 10 by virtue of the novel supporting means disclosed herein, certain types of trucks, such as those having box-type beds of the type commonly used by utility companies, which have formerly been deemed incapable of utilizing bolsters or the like for facilitating the transport of long objects, are permitted to enjoy the advantages of a pole bearing structure of this type, since the forward ends of the poles or joints of pipe will not oscillate during swinging movement of the trailer to strike the side panels of the truck bed or the like. The bracket 12 is of such type as to lend adequate support to the bolster 44, but is of such a construction that the plates 28 and 34 and the bolster 44 may be removed therefrom with the same presenting an upper flat surface that will not interfere with the normal use of the truck. The present invention is of such a construction that the parts are readily discerptible for replacement of parts due to wear or the like, and this is particularly true of the support plate 28 which rotatably supports the bolster 44 through engagement with the bearing member 34. Although the opening 22 has been illustrated as being substantially square and the portion 32 being complementary thereto, it will be readily appreciated that the portion 32 could be circular and pivotally received in the opening 22 if such a construction was desired so as to permit additional free movement of the king pin 38 for further decreasing the possibility of the pole contacting the side walls of the bed 10 with any considerable force.

From the foregoing, the construction and operation of the device will be readily understood and further explanation is believed to be unnecessary. However, since numerous modifications and changes will readily occur to those skilled in the art, it is not desired to limit the invention to the exact construction shown and described, but all suitable modifications and equivalents may be resorted to, falling within the scope of the appended claims.

Having described the invention, what is claimed as new is:

1. In the combination of a towing vehicle and a trailer having a bolster thereon and the forward end of its tongue pivotally coupled to the rear end of the towing vehicle; an improvement comprising a bracket secured to the rear end of the towing vehicle, said bracket having a flat horizontal upper surface which extends rearwardly of the towing vehicle and the bracket being provided with a vertical pocket adjacent its rear end, a support plate disposed on said bracket and extending rearwardly therefrom, an element depending from the support plate and received in the pocket, a bearing plate slidably disposed on said support plate, a bolster secured to said bearing plate, and a vertical king pin pivotally connecting the bolster and the bearing plate to the support plate.

2. The combination of claim 1, wherein said bolster comprises an elongated horizontal load supporting member having upstanding load retaining posts adjacent its opposite ends, an elongated brace member is provided below the supporting member and has its ends upwardly and outwardly inclined and attached to the underside of the supporting member, said brace member being spaced intermediate its ends from the supporting member and vertical braces connecting the members, said brace member being secured to the bearing plate.

3. A bolster attachment for use with towing vehicles having a box type bed, comprising a bracket mountable upon a truck bed, said bracket having a flat upper surface and a depending portion with a vertical pocket therein, a support plate on said bracket and extending rearwardly therefrom and having a depending element received in said pocket, a bearing plate slidable on said support plate, a bolster disposed on and secured to the bearing plate, a king pin pivotally securing the bolster and bearing plate to the support plate.

4. A bolster attachment for use with towing vehicles having a box type bed, comprising a bracket mountable upon a truck bed, said bracket having a flat upper surface and a depending portion with a vertical pocket therein, a support plate on said bracket and extending rearwardly therefrom and a depending element carried by the support plate and received in said pocket, a bearing plate slidably disposed on the support plate, a bolster disposed on and secured to the bearing plate, a king pin pivotally securing the bolster to the support plate, said bolster comprising an elongated load supporting member having a pair of upstanding load retaining members adjacent its opposite ends, an elongated brace member disposed below said supporting member and being bent to extend upwardly and outwardly adjacent its opposite ends with such ends being attached to the supporting member, said brace member intermediate its ends being spaced from said supporting member and vertical braces connecting the members, and said brace member being secured to the bearing plate.

HERSCHEL E. ROBERTSON.

REFERENCES CITED

The following references are of record in the file of this patent:

UNITED STATES PATENTS

| Number | Name | Date |
|---|---|---|
| 1,327,265 | Booth | Jan. 6, 1920 |
| 1,608,660 | Nabors | Nov. 30, 1926 |
| 2,419,442 | Dorsey | Apr. 22, 1947 |